(12) United States Patent
Haala

(10) Patent No.: US 7,546,687 B2
(45) Date of Patent: Jun. 16, 2009

(54) FRAMING TOOL

(76) Inventor: David M. Haala, 22098 First Ave. South, Sleepy Eye, MN (US) 56085

( * ) Notice: Subject to any disclaimer, the term of this patent is extended or adjusted under 35 U.S.C. 154(b) by 2 days.

(21) Appl. No.: 11/759,496

(22) Filed: Jun. 7, 2007

(65) Prior Publication Data

US 2008/0301962 A1    Dec. 11, 2008

(51) Int. Cl.
*B43L 7/12* (2006.01)

(52) U.S. Cl. .............................. 33/415; 33/418; 33/465; 33/478; 33/529; 33/535

(58) Field of Classification Search .................. 33/415, 33/418, 452, 465, 474, 475, 478, 481, 529, 33/412, 535, 370, 371
See application file for complete search history.

(56) References Cited

U.S. PATENT DOCUMENTS

| 292,017 | A | * | 1/1884 | Jones | 33/478 |
|---|---|---|---|---|---|
| 735,201 | A | * | 8/1903 | Blandin | 33/478 |
| 1,553,229 | A | * | 9/1925 | Fraser | 33/474 |
| 1,648,266 | A | * | 11/1927 | Grass | 33/478 |
| 3,670,418 | A | * | 6/1972 | Hamilton, Jr. | 33/419 |
| 5,452,522 | A | * | 9/1995 | Kook et al. | 33/451 |
| 5,524,353 | A | * | 6/1996 | Fink | 33/451 |

* cited by examiner

*Primary Examiner*—Christopher W Fulton
(74) *Attorney, Agent, or Firm*—Nawrocki, Rooney & Sivertson, P.A.

(57) ABSTRACT

Apparatus using two hinged L-shaped squares to determine perpendicular with respect to a plane. Placing the apparatus against a plane with the squares offset angularly with respect to each other and placing an object to be secured to a plane adjacent to the hinge within fins parallel to the hinge permits securing the object perpendicular to the plane with one hand while holding the apparatus and object with the other hand.

8 Claims, 4 Drawing Sheets

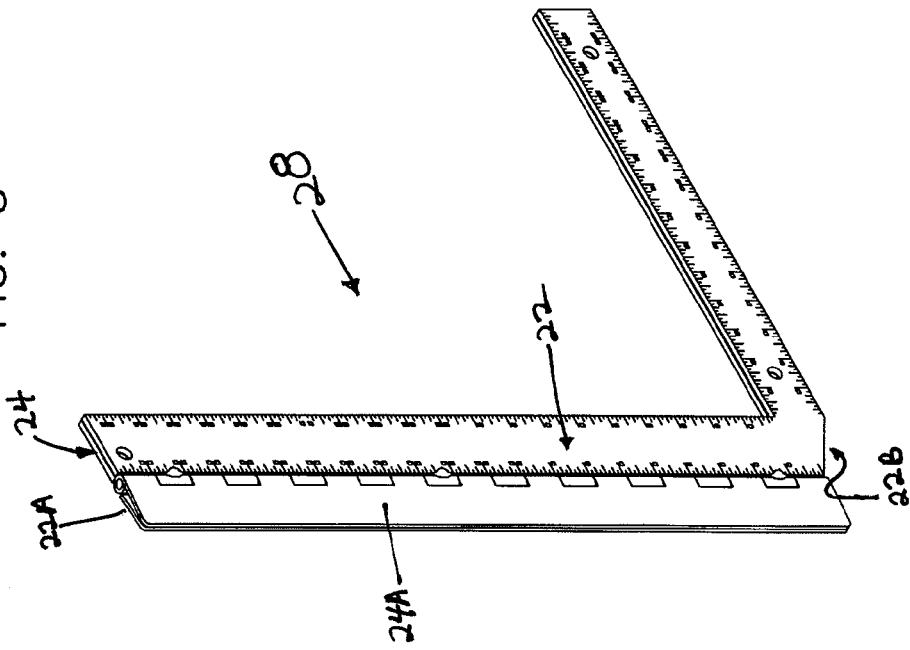
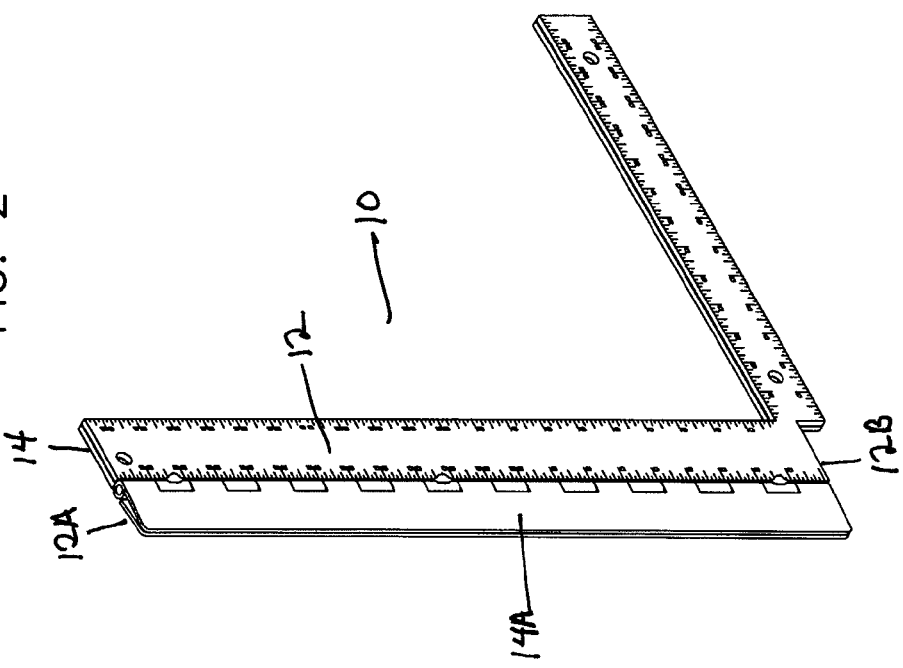

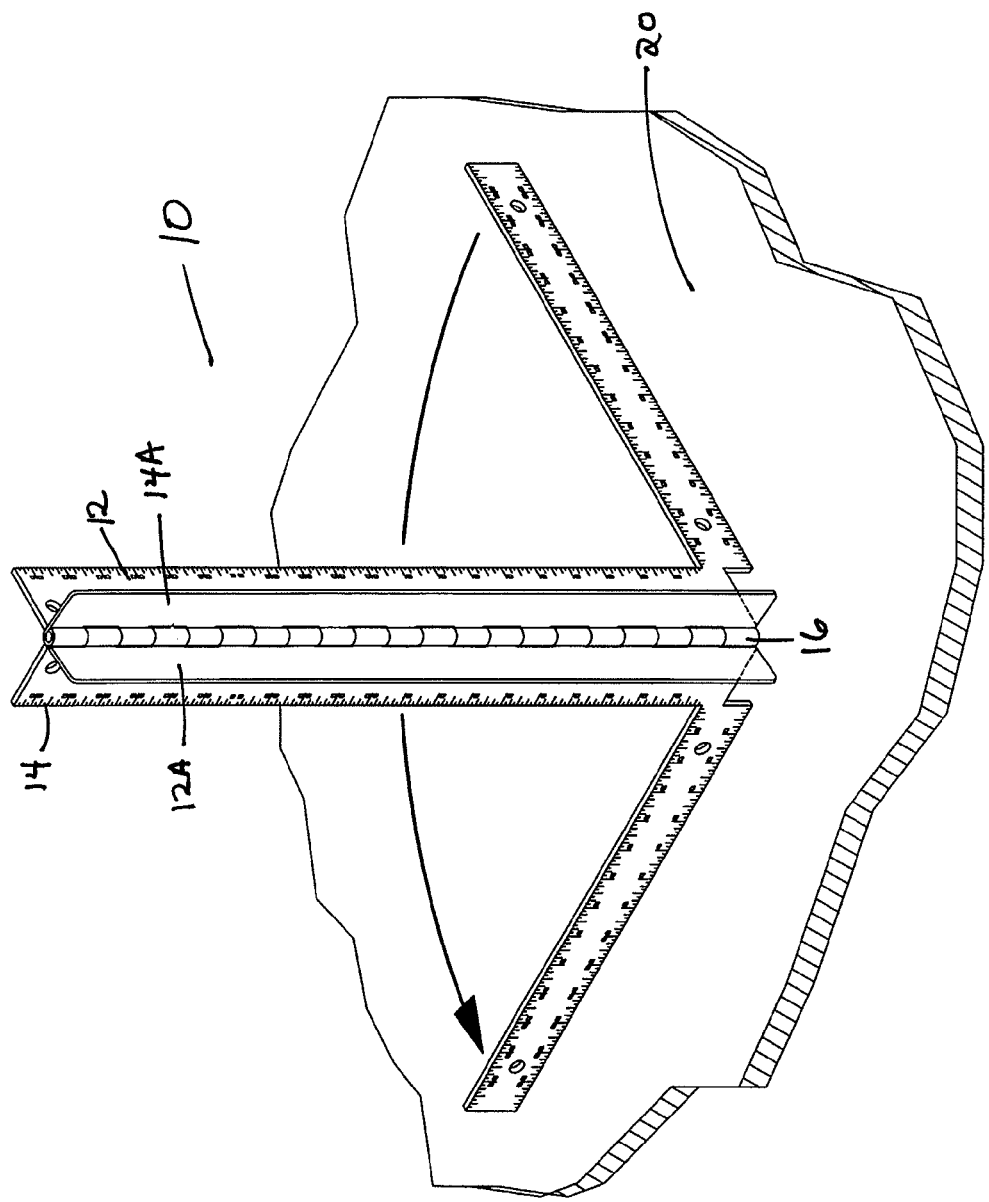

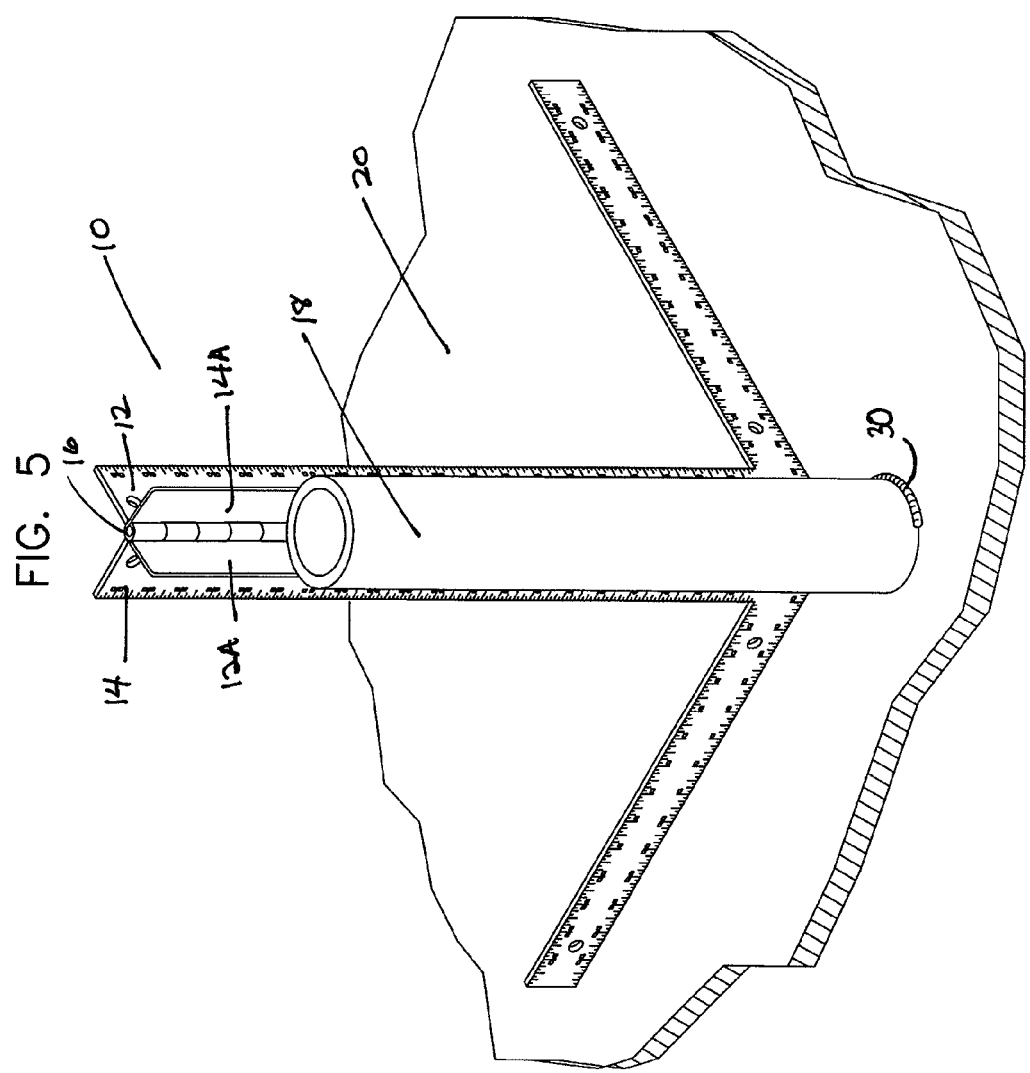

FRAMING TOOL

FIELD OF THE INVENTION

The present invention is a tool for measuring and defining a vertical relationship of an elongated member with respect to a plane using only one measurement and further using the same apparatus to orient an object perpendicular to the same plane to simplify framing.

BACKGROUND OF THE INVENTION

In construction and assembly it is frequently necessary to orient an element perpendicular to a plane. This is usually accomplished by utilizing a square to define the vertical with respect to one axis of a plane. The process is then repeated with respect to a second intersecting axis. The problem with this approach is the difficulty in retaining the orientation of the object with respect to the first axis when defining the second axis.

SUMMARY OF THE INVENTION

This apparatus permits orientating an elongate element perpendicular to a plane with respect to two intersecting axes angled relative to each other. The apparatus incorporates two right angle squares which can be hinged together and arranged to permit the squares to be oriented at an angle relative to each other by merely opening the squares with respect to each other. When opened to an angle with one side of both squares against a surface, the hinge will be perpendicular to the plane. The element to be attached, which can be generally cylindrical, is positioned against fins, which are extensions from each square and aligned with the hinge, to orient the element perpendicular to the plane. The apparatus and the element to be attached can both be held together against the plane with one hand, in order to orient the element perpendicular to the plane. The other hand can be free to secure the element to the plane. The invention greatly simplifies framing an element perpendicular to a plane.

BRIEF DESCRIPTION OF THE DRAWINGS

The objects and features of the present invention will become more manifest to those skilled in the art upon a reading of the following descriptions taken in connection with the accompanying drawing figures wherein:

FIG. 2 shows an alternative embodiment with the hinged squares folded together and portions of the squares removed;

FIG. 3 shows a second alternative embodiment with two hinged squares folded together and portions of the squares removed in a different manner;

FIG. 4 shows the apparatus of FIG. 2 with the squares opened to an angle with respect to each other adjacent to a plane; and FIG. 5 shows the apparatus and a pipe element adjacent to and aligned with the hinge extending to the plane.

DETAILED DESCRIPTION OF THE INVENTION

Figure 1:
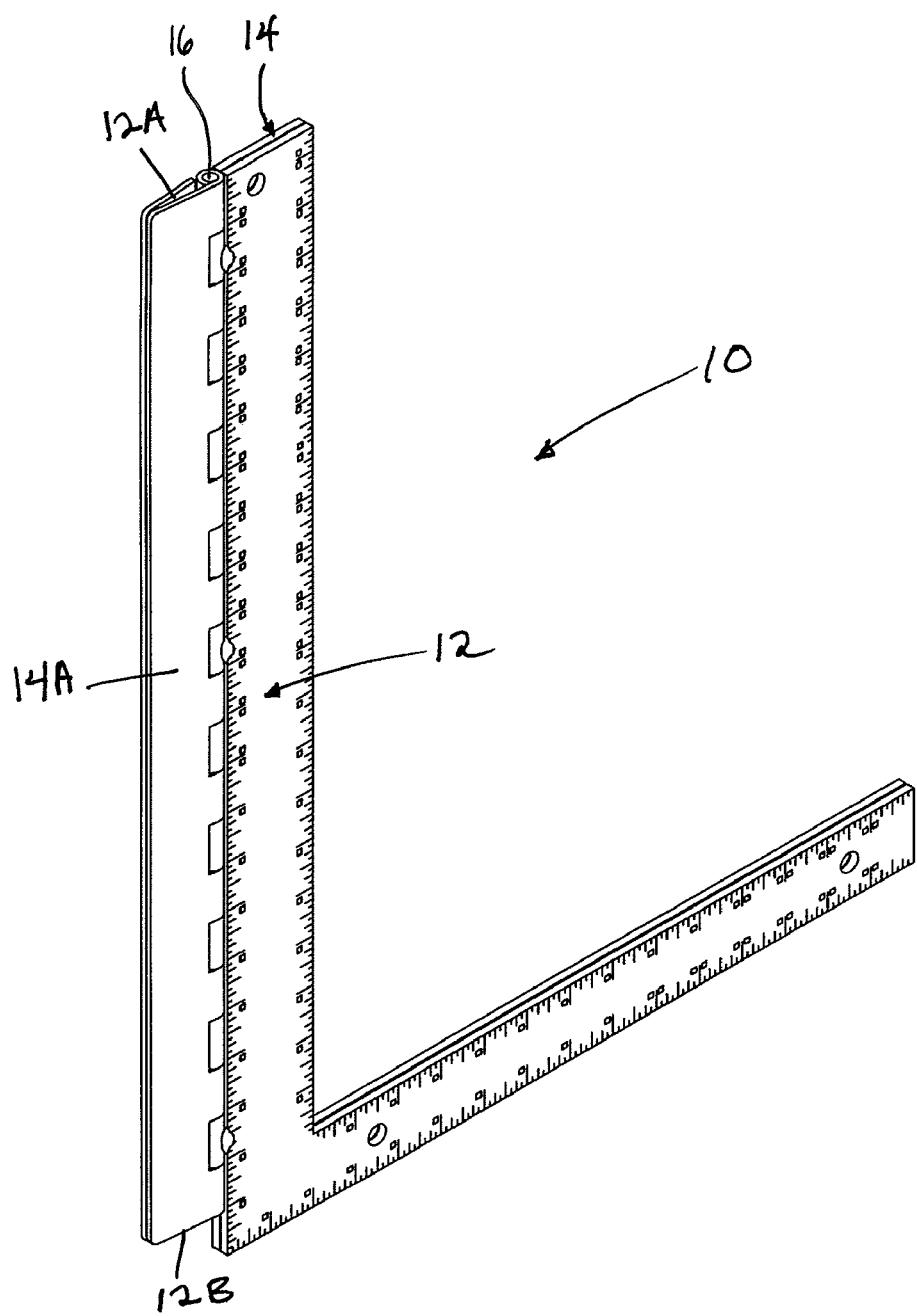
FIG. 1 shows a first embodiment of the invention with two hinged squares folded together and fins extending from the squares aligned with the hinge.

FIGS. 1 and 5 show a first embodiment of the present apparatus 10. Apparatus 10 has a first L-shaped square 12 and a second L-shaped square 14 pivotably attached together along one edge at hinge 16. First square 12 has a fin extension 12A, and second square 14 has a fin extension 14A; fins 12A, 14A extend outward from hinge 16. The lower ends of fin extensions 12A, 14A terminate to define notch 12B and substantially identical notch 14B. Notches 12B and 14B are provided to make performance of an operation such as welding more facile. FIG. 1 shows apparatus 10 folded while FIG. 5 shows the apparatus with first square 12 with an angular offset relative to the second square 14.

As shown in FIG. 4, with square 12 angularly offset from square 14, hinge 16 and apparatus 10, including first fin extension 12A and second fin extension 14A, will all be oriented perpendicular to the plane 20.

FIG. 5 shows apparatus 10 arranged substantially the same as in FIG. 4 with respect to plane 20, and, with pipe 18 located within the angle between first fin extension 12A and second fin extension 14A, the pipe 18 will be oriented perpendicular to the plane 20. Apparatus 10 and pipe element 18 can both be held together against plane 10 as shown using only one hand which will free the other hand to effect attachment of pipe 18 to plane 20.

FIG. 3 shows another embodiment 28 with a first square 22, a second square 24 and a hinge 16. The first square 22 has a first fin extension 22A with an angled supplemental notch 22B, while the second square 24 has a second fin extension 24A. The distinction between first embodiment 10 and second embodiment 28 is the angled edge of notch 22B inclined with respect to the hinge 16. In the prior embodiment, the L-shaped squares are not notched. The purpose and operation of the notch 22B of the embodiment of FIG. 3 is to make affixation by welding, for example, easier.

This apparatus greatly simplifies attaching a cylindrical shaped element, in particular, perpendicular to a planar surface in that one hand is free to attach the element while the other secures the apparatus against the plane.

FIGS. 2 and 4, while similar to the embodiment of FIGS. 1 and 5, also has a notch 12B carved out of the L-shaped squares themselves proximate the intersection of the legs of each L-shaped square. The notch 12B in the embodiment of FIGS. 1 and 5 is defined by a termination of fins 12A, 14A at a distance from the edges of the squares 12, 14 which engage surface 20. In any case, however, notch 12B of the embodiment of FIGS. 2 and 4 has, in the cutting away of a portion of the L-shaped squares themselves, the same purpose as does the angled-edge notching of the embodiment of FIG. 3. That is, it serves to facilitate affixation of workpiece 18 to the generally planar surface 20.

Affixation of workpiece 18 can be accomplished in any appropriate manner. For example, as illustrated in FIG. 5, welding, as illustrated at 30, can be used for affixation.

It will be understood that this disclosure, in many respects, is only illustrative. Changes may be made in details, particularly in matters of shape, size, material, and arrangement of parts without exceeding the scope of the invention. Accordingly, the scope of the invention is as defined in the language of the appended claims.

What is claimed is:

1. A tool to assist in mounting a workpiece substantially perpendicular to a generally planar surface, comprising:
    (a) a first L-shaped member having a first arm including a linear edge engageable with the generally planar surface and a second generally planar arm defining a first axis substantially perpendicular to said linear edge;
    (b) a second L-shaped member having a first arm including a linear edge engageable with the generally planar surface and a second generally planar arm defining a second axis substantially perpendicular to said linear edge of said second L-shaped member first arm; and (c) means for mating said first and second L-shaped members to each other with said first and second axes superimposed one upon the other for relative pivoting movement of said L-shaped members with respect to said superimposed axes, and with said linear edges diverging from said superimposed axes at a common point therealong;

(d) wherein each of said second arms defines a fin on a side of said superimposed axes opposite a corresponding first arm, said fins jointly forming a channel within which the workpiece is received substantially perpendicular to the generally planar surface.

2. A tool in accordance with claim 1 wherein the workpiece has an annular first axial end engageable with the generally planar surface and a generally cylindrical wall, each of said fins engaging at least a portion of the cylindrical wall when the workpiece is received within the channel.

3. A tool for orienting an elongated generally cylindrical workpiece substantially perpendicular to a generally planar surface to which the workpiece is to be welded, comprising:

(a) a first framing square having a first linear edge engageable with the generally planar surface and an arm with a first mating edge spaced angularly from said first linear edge at substantially 90°;

(b) a second framing square having a second linear edge engageable with the generally planar surface and an arm with a second mating edge spaced angularly from said second linear edge at substantially 90°; and (c) means for pivotally mating together said first and second framing squares along said first and second mating edges to define an axis of pivoting, said first and second linear edges diverging from said axis at a common point therealong.

4. A tool in accordance with claim 3 further comprising a first fin extending from the arm having said first mating edge, and a second fin extending from the arm having said second mating edge, said fins extending substantially coplanar with their respective arms, said fins forming a channel within which the workpiece can be received.

5. A tool in accordance with claim 4 wherein said fins extend from corresponding arms on a side of said axis opposite that of said corresponding arms.

6. A tool in accordance with claim 5 wherein said arms and said fins terminate, at ends thereof proximate the generally planar surface, at a distance spaced from the generally planar surface.

7. A tool in accordance with claim 6 wherein said spacing of said proximate ends of said arms and said fins is defined by rectangular cutouts.

8. A tool in accordance with claim 6 wherein said spacing of said proximate ends of said arms and said fins is defined by triangular cutouts.

\* \* \* \* \*